United States Patent [19]
Cryder et al.

[11] 3,994,325
[45] Nov. 30, 1976

[54] APPARATUS FOR HARVESTING A TREE
[75] Inventors: John R. Cryder; James A. Thomas, both of Joliet, Ill.
[73] Assignee: Caterpillar Tractor Co., Peoria, Ill.
[22] Filed: Nov. 17, 1975
[21] Appl. No.: 632,431

[52] U.S. Cl. .................................. 144/3 D; 60/413; 91/32; 144/34 E; 144/309 AC
[51] Int. Cl.² .......................................... A01G 23/08
[58] Field of Search ............... 91/5, 16, 32; 60/413, 60/404; 144/2 Z, 3 D, 34 R, 34 E, 309 AC

[56] References Cited
UNITED STATES PATENTS

| | | | |
|---|---|---|---|
| 3,690,354 | 9/1972 | Moser | 144/34 R |
| 3,700,060 | 10/1972 | Keene et al. | 60/413 X |
| 3,939,886 | 2/1976 | Tucek | 91/32 X |

Primary Examiner—Frank T. Yost
Assistant Examiner—W. D. Bray
Attorney, Agent, or Firm—Frank L. Hart

[57] ABSTRACT

In an improved method and apparatus for harvesting a tree, the pressure exerted on the tree by a grapple assembly is at a first preselected value during shearing of the tree trunk and positioning the severed tree for further processing. The pressure exerted on the tree by the grapple assembly is thereafter reduced to a second preselected value and the tree is further processed.

10 Claims, 4 Drawing Figures

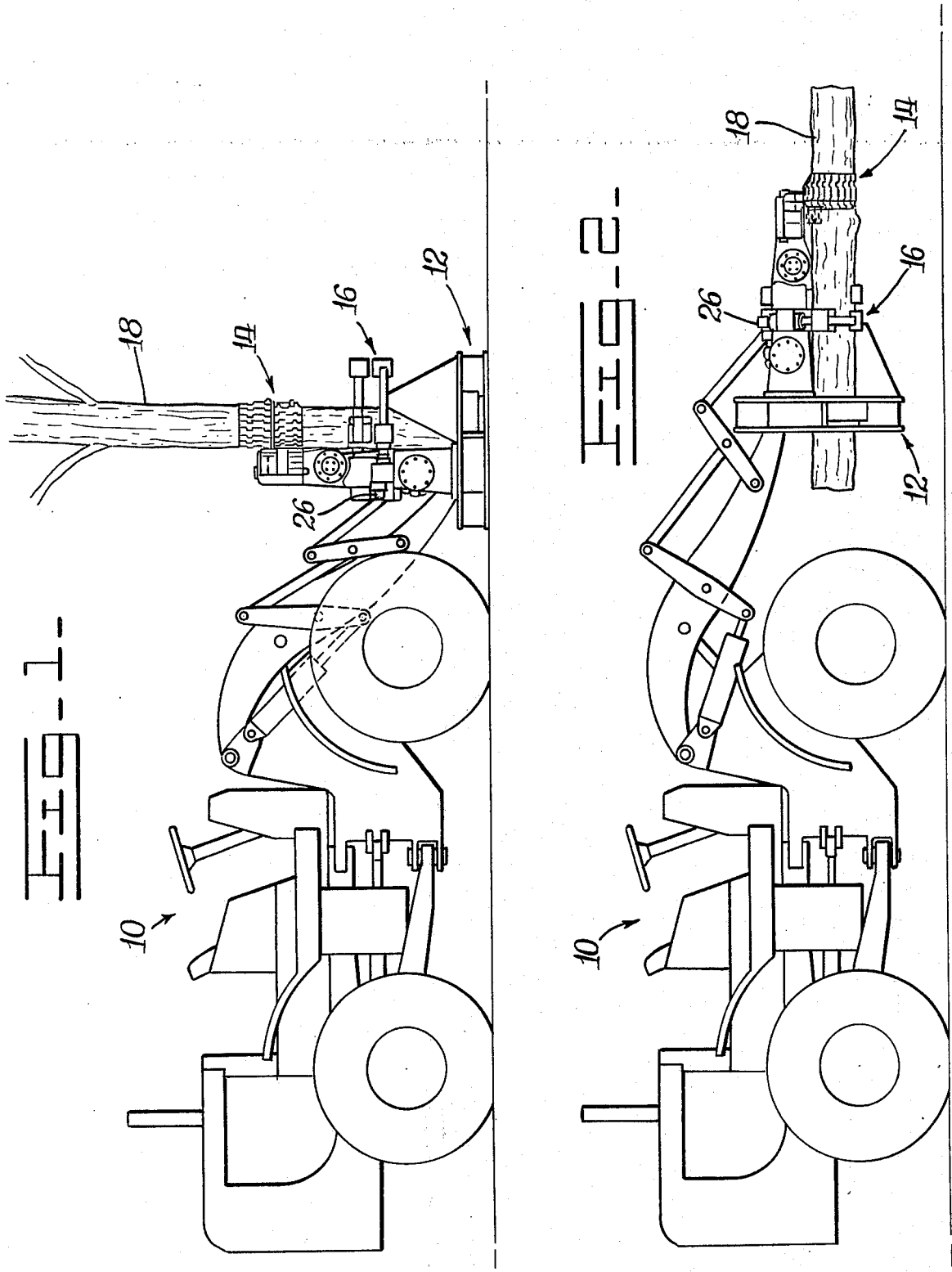

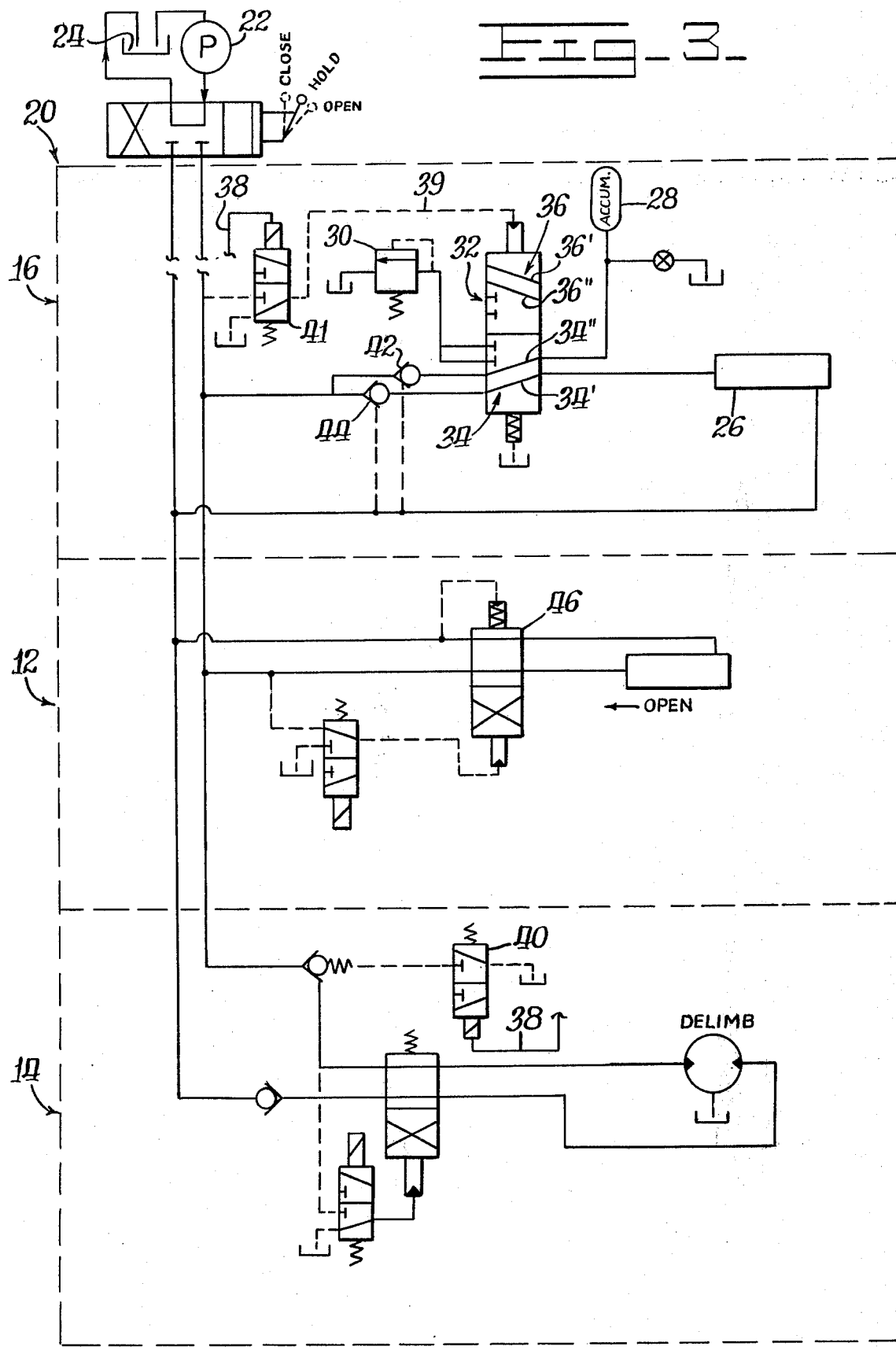

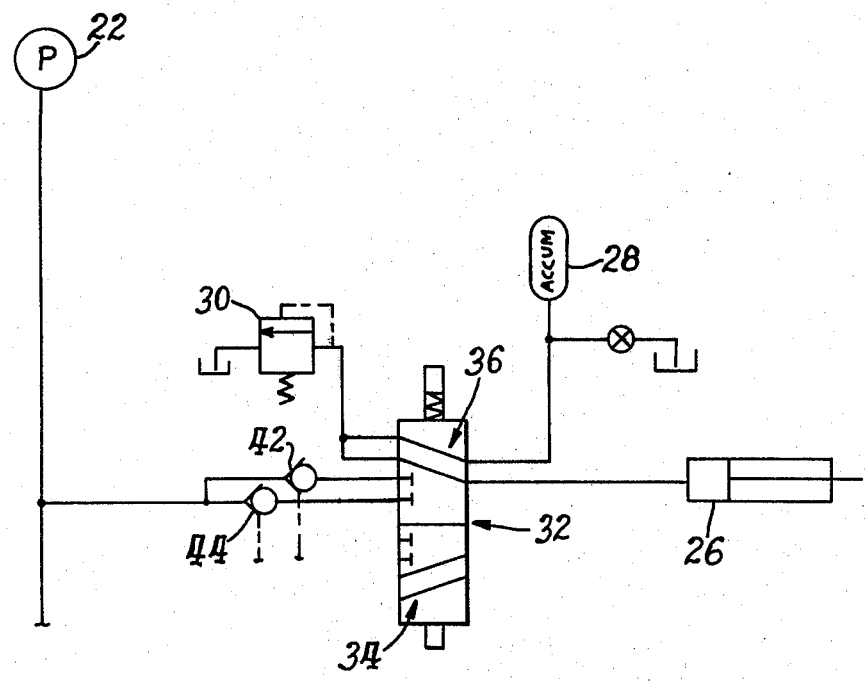
FIG_4

APPARATUS FOR HARVESTING A TREE

BACKGROUND OF THE DISCLOSURE

Tree harvesting apparatus, such as described in U.S. Pat. No. 3,690,354 - Moser, and which is hereby incorporated by reference, are effectively used for cutting down a tree, positioning the severed tree with the trunk oriented generally horizontally, and further processing the tree by, for example, severing limbs of the tree from the trunk.

During cutting down and positioning the tree, it is necessary for the harvesting apparatus to be tightly secured to the tree in order to maintain control over the severed tree. The tree is forcibly maintained relative to the harvester by a grapple which is positioned about the tree trunk and forcibly engaging said trunk.

During further processing of the tree, subsequent to orienting the severed tree generally horizontally, it is desirable to have improved control over the forcible engagement of the tree by the grapple. This invention thereby resides in method apparatus and a hydraulic system for controlling the tree engaging pressure of the grapple which results in improving the operation of the harvester during processing of the tree.

BRIEF DESCRIPTION OF THE DRAWINGS

FIG. 1 is a diagrammatic view of a tree harvester with the grapple in the tree severing mode;

FIG. 2 is a diagrammatic view of a portion of a tree harvester with the grapple maintaining a severed tree oriented for further processing;

FIG. 3 is a diagrammatic view of a portion of the hydraulic control system of the tree harvester; and FIG. 4 is a diagrammatic view of the selector valve of FIG. 3 located at the valve's second position.

DETAILED DESCRIPTION OF THE INVENTION

Referring to FIGS. 1 and 2, a tree harvester 10 has a shear assembly 12, a processing assembly 14, a grapple assembly 16, and a hydraulic system.

As is known in the art and more fully disclosed in the above-identified patent, the grapple assembly 16 is forcibly engaged about the trunk 18 of a tree for maintaining the tree oriented relative to the tree harvester 10. The shear assembly is thereafter actuated to sever the tree trunk and the grapple assembly 16 maintains the tree while the tree is being oriented generally horizontally for further processing (See FIG. 2). In the generally horizontal position, the processing assembly 14 is actuated for further processing the severed tree, as for example by delimbing the trunk 18.

Referring to FIG. 3, the hydraulic system 20 of the harvester 10 has a pump 22 operably connected to a hydraulic fluid reservoir 24 and the shear, processing, and grapple assemblies 12, 14, 16, among others. As can be seen by the drawing, the shear, processing, and grapple assemblies 12, 14, 16 are connected to the pump 22 in parallel.

The grapple assembly 16 has a hydraulic grapple 26 operably connected via hydraulic lines, through a selector valve 32 to the pump 22, an accumulator 28, and a pressure relief valve 30. The selector valve 32 is positioned between the pump 22 and the grapple 26 and separates the pressure relief valve 30 from the accumulator 28 and the grapple 26.

The selector valve 32 has first and second major passageways 34, 36. If desirable, the valve 32 can be constructed such that each of the first and second major fluid passageways 34, 36 comprise a plurality of passageways 34', 34'', 36', 36'' for individually serving the various elements.

The selector valve passageways 34, 36 are movable between a first position (FIG. 3) at which the grapple 26 and the accumulator 28 are in fluid communication with the pump 22 through the first passageway 34 and a second position (FIG. 4) at which the grapple 26, accumulator 28, and pressure relief valve 30 are in fluid communication one with the other through the second passageway 36 of said selector valve 32.

At the first position of the selector valve 32 (FIG. 3), the pressure relief valve 30 is blocked by the selector valve 32 from fluid communication with the accumulator 28, grapple 26, and pump 22. At the second position of the selector valve 32 (FIG. 4), the pump 22 is blocked by the selector valve 32 from fluid communication with the pressure relief valve 30, accumulator 28, and grapple 26.

The selector valve 32 preferably is a control valve that is operably connected to actuating elements 40, 41 via lines 38, 39 for shifting the selector valve 32 between the first and second positions in response to activation and deactivation of the processing assembly 14. However, the selector valve 32 can be pneumatically or mechanically operated without departing from this invention. Further, line 38 can be operably directly connecting elements 40, 41 or said elements 40, 41 can be connected together through another actuating element, for example, a switch common to both elements 40, 41.

The pressure relief valve 30 is of a construction sufficient to open and pass hydraulic fluid from the accumulator 28 and/or the grapple 26 in response to moving the selector valve from the first position to the second position during operation of the processing assembly 14. At the second position of the selector valve 32, the pressure relief valve 30 functions to reduce the hydraulic pressure exerted on the grapple and lower said pressure to a preselected, reduced value.

This preselected lower hydraulic pressure is, for example, 1800 psi or about 700 psi less than the hydraulic pressure exerted on the grapple during severing of the tree trunk and positioning of the severed tree in a generally horizontal position. By so lowering the pressure exerted on the grapple 26, the forcible engagement of the grapple 26 with the tree trunk 18 is sufficiently lower to facilitate passage of the tree past the processing assembly 14 during further processing of the tree.

In the method of this invention, the harvester 10 is moved to a position with the grapple 26 adjacent a tree to be processed. The operator controls are actuated to cause the hydraulic pump 22 to deliver hydraulic fluid through check valves 42, 44, through the first main passageway 34 of the selector valve 32 and to the grapple 26 and accumulator 28. This causes the grapple 26 to tightly close about the tree trunk and the accumulator 28 to be pressurized to a first preselected operating pressure of, for example, about 2500 psi. At this period in the operational mode. the grapple 26 is forcibly connecting the harvester 10 to the tree.

The operator then actuates controls for opening valve 46 which actuates the shear assembly 12 and severs the tree. The severed tree is thereafter oriented generally horizontally to the ground, as shown in FIG. 2, while the grapple 26 is subjected to the first preselected hydraulic pressure.

After the tree has been oriented generally horizontally with the ground by pivoting the grapple assembly 16, operator controls are actuated which energize element 40 for actuating the processing assembly 14.

In the preferred embodiment of the apparatus of this invention, actuation of elements 40 and 41 function to automatically actuate the selector valve 32 to move from the first to the second position. However, it should be understood that the selector valve 32 and elements 40, 41 can be independently controlled without departing from this invention.

In response to the selector valve 32 moving to the second position, as shown in FIG. 4, the pump 22 is isolated from the grapple 26, accumulator 28, and the pressure relief valve 30 and in turn the grapple 26, accumulator 28 and pressure relief valve 30 are brought into fluid communication one with the other through the second passageway 36 of the selector valve 32. Hydraulic fluid then passes through selector valve passageway 36 from the grapple 26 and the accumulator 28 and to the pressure relief valve 30.

Since the pressure relief valve 30 is constructed to maintain a pressure at or less than the second preselected value as described above, the relief valve 30 is caused to open and pass fluid until the pressure in the grapple 26 and accumulator 28 has been reduced to the second, lower preselected pressure. The pressure relief valve 30 thereafter closes in response to the pressure reaching the second preselected value.

By so lowering the hydraulic pressure of the grapple 26, the grapple is thereafter engaging the tree trunk with a preselected force that is less than the engagement force utilized during cutting and positioning operations. Further processing operations can thereafter be subjected on the tree with improved efficiency. Further, the second preselected pressure can be easily changed by altering the pressure relief valve and this preselected pressure is not responsive to changes in the operating pressure of associated equipment in the second position of the selector valve.

Other aspects, objects, and advantages of this invention can be obtained from a study of the disclosure and appended claims.

What is claimed is:

1. In a tree harvester having a processing assembly for propelling and processing a tree, a grapple for maintaining the tree positioned relative to the tree harvester, and a hydraulic system having a pump connected to the processing assembly and grapple for controlling the operations thereof, the improvement comprising:
    an accumulator;
    a pressure relief valve; and
    a selector valve connected to the pump, the grapple, the accumulator, and the pressure relief valve and being positioned in the hydraulic system at a location between the pump and the grapple, said selector valve having at least first and second passageways therethrough and being movable between a first position at which the grapple and the accumulator are in fluid communication with the pump through the first passageway and a second position at which the grapple, the accumulator, and the pressure relief valve are in fluid communication one with the other through the second passageway, said relief valve being blocked from fluid communication through the selector valve at said first position and said pump being blocked from fluid communication through the selector valve at said second position for selectively controlling the operation of the grapple.

2. Apparatus, as set forth in claim 1, wherein the pressure relief valve connected to the grapple is of a construction sufficient to open and pass hydraulic fluid from the grapple in response to sensing a pressure greater than a preselected value at the second position of the selector valve.

3. Apparatus, as set forth in claim 1, including means for connecting the selector valve to the processing assembly for shifting the selector valve in response to activation and deactivation of said processing assembly.

4. Apparatus, as set forth in claim 1, wherein the processing assembly and the grapple are connected in parallel and to the pump.

5. Apparatus, as set forth in claim 1, including a shear assembly and wherein the shear assembly and the grapple are connected in parallel and to the pump.

6. In a hydraulic system having a first element and a pump connected to the first element, the improvement comprising:
    an accumulator;
    a pressure relief valve; and
    a selector valve connected to the pump, the first element, the accumulator, and the pressure relief valve and being positioned in the hydraulic system at a location between the pump and the first element, said selector valve having at least first and second passageways therethrough and being movable between a first position at which the first element and the accumulator are in fluid communication with the pump through the first passageway and a second position at which the first element, the accumulator, and the pressure relief valve are in fluid communication one with the other through the second passageway, said relief valve being blocked from fluid communication through the selector valve at said first position and said pump being blocked from fluid communication through the selector valve at said second position for selectively controlling the operation of the first element.

7. A hydraulic system, as set forth in claim 6, including a second element, and means for connecting the selector valve to the second element for selectively shifting the selector valve in response to activation and deactivation of said second element.

8. Apparatus, as set forth in claim 6, wherein the pressure relief valve connected to the first element is of a construction sufficient to open and pass hydraulic fluid from the first element in response to sensing a pressure greater than a preselected value.

9. Apparatus, as set forth in claim 7, wherein the first and second elements are connected in parallel and to the pump.

10. Apparatus, as set forth in claim 7 including a third element and wherein the third element and the first element are connected in parallel and to the pump.

* * * * *